US012577810B2

(12) United States Patent
Williams et al.

(10) Patent No.: US 12,577,810 B2
(45) Date of Patent: Mar. 17, 2026

(54) DISPENSER LOCKING ASSEMBLIES

(71) Applicant: Cintas Corporate Services, Inc., Cincinnati, OH (US)

(72) Inventors: Stephen Williams, Atlanta, GA (US); Ryan M. Baker, Atlanta, GA (US); Blake Guzewicz, Atlanta, GA (US)

(73) Assignee: Cintas Corporate Services, Inc., Cincinnati, OH (US)

( * ) Notice: Subject to any disclaimer, the term of this patent is extended or adjusted under 35 U.S.C. 154(b) by 59 days.

(21) Appl. No.: 18/424,978

(22) Filed: Jan. 29, 2024

(65) Prior Publication Data

US 2024/0263484 A1 Aug. 8, 2024

Related U.S. Application Data

(60) Provisional application No. 63/443,797, filed on Feb. 7, 2023.

(51) Int. Cl.
*E05B 27/00* (2006.01)
*E05B 1/00* (2006.01)
(Continued)

(52) U.S. Cl.
CPC ........ *E05B 27/0046* (2013.01); *E05B 1/0038* (2013.01); *E05B 13/105* (2013.01); *E05B 63/0065* (2013.01); *E05B 2015/1642* (2013.01)

(58) Field of Classification Search
CPC .. E05B 1/0038; E05B 13/105; E05B 15/1635; E05B 15/1642; E05B 15/1664;
(Continued)

(56) References Cited

U.S. PATENT DOCUMENTS 3,026,385 A 3/1962 Davis et al.
3,500,667 A * 3/1970 Jespersen .................. E05C 5/00 70/84

(Continued)

FOREIGN PATENT DOCUMENTS

WO 2021262046 A1 12/2021
WO 2023036324 A1 3/2023

OTHER PUBLICATIONS

European Patent Office, Extended Search Report issued in EP 24156095.2-1005, dated Jun. 11, 2024 (8 pages).

*Primary Examiner* — Christopher J Boswell
(74) *Attorney, Agent, or Firm* — FBT GIBBONS LLP

(57) ABSTRACT

A locking assembly for a dispenser may include a locking component and a barrel. The locking component is movable between (i) a first position configured to lock a cover of the dispenser, and (ii) a second position configured to unlock the cover. The barrel is rotatable between (i) a first barrel position configured to resist movement of the locking component, and (ii) a second barrel position configured to permit movement of the locking component. The barrel defines a barrel opening configured to receive a key or a push button. A dispenser including a dispenser plate and a cover may further include the locking assembly. The dispenser defines an interior closable with the cover. The cover is movably coupled to the dispenser plate. The locking assembly releasably secures the cover to the dispenser plate.

18 Claims, 14 Drawing Sheets

(51) Int. Cl.
*E05B 13/10* (2006.01)
*E05B 63/00* (2006.01)
*E05B 15/16* (2006.01)

(58) Field of Classification Search
CPC ............ E05B 27/0003; E05B 27/0046; E05B 63/0065
See application file for complete search history.

(56) References Cited

U.S. PATENT DOCUMENTS

| | | | | | |
|---|---|---|---|---|---|
| 3,919,866 | A | * | 11/1975 | Lipschutz ............... | E05B 17/04 70/81 |
| 4,910,982 | A | * | 3/1990 | Dana ......................... | E05B 9/08 70/451 |
| 5,479,800 | A | * | 1/1996 | Myers ................... | E05B 35/008 70/370 |
| 6,443,505 | B1 | * | 9/2002 | Linares ................... | E05B 17/04 292/195 |
| 6,575,503 | B1 | * | 6/2003 | Johansson ............... | E05B 5/003 292/336.3 |
| 7,984,829 | B2 | | 7/2011 | Cittadino et al. | |
| 8,528,787 | B2 | | 9/2013 | Cittadino et al. | |
| 8,561,441 | B2 | | 10/2013 | Herrmann et al. | |
| 8,783,511 | B2 | | 7/2014 | Snodgrass | |
| 9,279,273 | B2 | | 3/2016 | Eriksson et al. | |
| 9,637,950 | B2 | * | 5/2017 | Covington ............ | E05B 35/008 |
| 10,617,263 | B2 | | 4/2020 | Ophardt et al. | |
| 10,743,721 | B2 | | 8/2020 | Wertheim | |
| 10,750,911 | B2 | | 8/2020 | McDonagh et al. | |
| 10,986,966 | B2 | | 4/2021 | Tojek et al. | |
| 11,160,423 | B2 | | 11/2021 | Marshall | |
| 11,454,056 | B2 | | 9/2022 | Paré | |
| 11,723,494 | B2 | | 8/2023 | Spandl et al. | |
| 11,882,968 | B2 | | 1/2024 | Wanninger et al. | |
| 11,903,537 | B2 | | 2/2024 | Rospierski et al. | |
| 2011/0303699 | A1 | | 12/2011 | Cittadino et al. | |
| 2012/0223077 | A1 | | 9/2012 | Claypool et al. | |
| 2013/0306677 | A1 | * | 11/2013 | Rosenkranz ........... | A47K 10/38 222/181.3 |
| 2014/0331724 | A1 | * | 11/2014 | Ayrest ................. | E05B 15/1607 70/344 |
| 2021/0253343 | A1 | | 8/2021 | Downing et al. | |
| 2023/0210320 | A1 | | 7/2023 | Achton | |
| 2023/0249883 | A1 | | 8/2023 | Bertucci et al. | |
| 2024/0008691 | A1 | | 1/2024 | Demonteiro et al. | |
| 2024/0011339 | A1 | * | 1/2024 | Henson ................. | E05B 35/008 |
| 2024/0418007 | A1 | * | 12/2024 | Kling .................... | E05B 65/006 |

* cited by examiner

DISPENSER LOCKING ASSEMBLIES

BACKGROUND OF THE INVENTION

This claims the benefit of U.S. Provisional Patent Application Ser. No. 63/443,797, filed Feb. 7, 2023 and hereby incorporated by reference in its entirety.

The present disclosure is generally in the field of dispensers, and more particularly related to locking assemblies for dispensers.

Dispensers may be used to dispense a volume of a composition, for example, a sanitizing composition, a cleaning composition, a soap, a detergent, or any other composition. The composition may be a liquid, a gel, a powder, or be in any other form.

A housing of the dispenser may be locked to prevent unauthorized or inadvertent access to the interior of the dispenser, while still providing a dispensing function. A locking assembly may be provided to facilitate locking of the housing. For example, authorized parties such as maintenance staff may access the interior of the dispenser by unlocking the housing.

A need remains for locking assemblies that provide reliable locking for dispensers.

SUMMARY

The present disclosure describes locking assemblies that can lock or release a cover of a dispenser using a key or a push button mechanism.

In embodiments, the present disclosure describes a locking assembly for a dispenser. The locking assembly includes a locking component configured to move between (i) a first position configured to lock a cover of the dispenser, and (ii) a second position configured to unlock the cover. The locking assembly further includes a barrel configured to rotate between (i) a first barrel position configured to resist movement of the locking component, and (ii) a second barrel position configured to permit movement of the locking component. The barrel defines a barrel opening configured to receive a key or a push button in some embodiments.

In embodiments, the present disclosure describes a dispenser including a dispenser plate, a cover, and the locking assembly. The dispenser defines an interior closable with the cover. The cover is movably coupled to the dispenser plate. The locking assembly releasably secures the cover to the dispenser plate.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

Figure 1A:
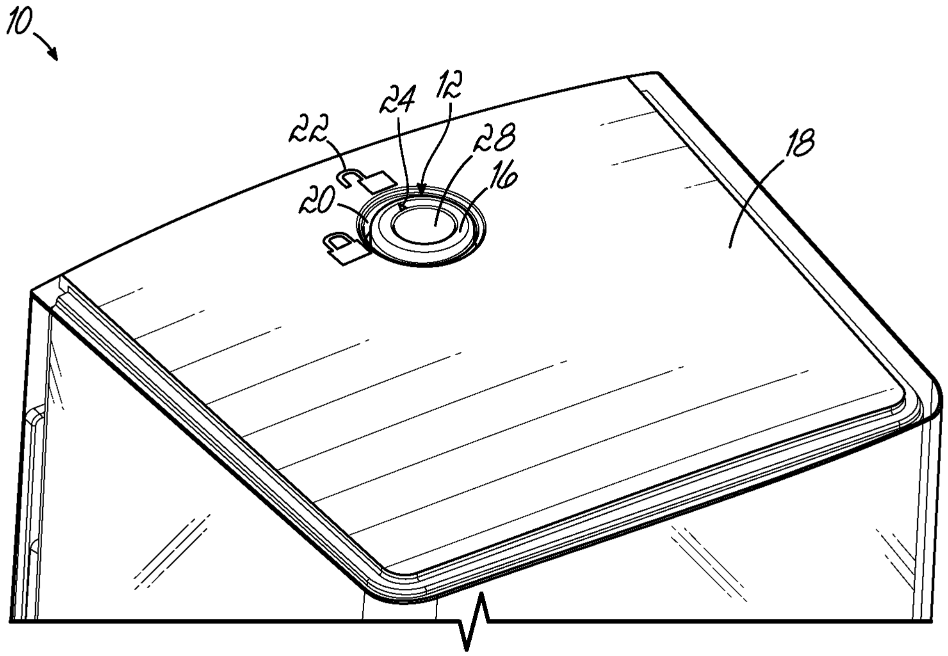
FIG. 1A is a partial perspective view of a dispenser including a locking assembly including a locking component and a barrel.

The present disclosure provides a more detailed and specific description with reference to the accompanying drawings. The drawings and specific descriptions of the drawings, as well as any specific or other embodiments discussed, are intended to be read in conjunction with the entirety of this disclosure.

DETAILED DESCRIPTION

Example embodiments will now be described more fully hereinafter with reference to the accompanying drawings, in which example embodiments are shown. The concepts disclosed herein may, however, be embodied in many different forms and should not be construed as limited to the example embodiments set forth herein; rather, these embodiments are provided so that this disclosure will be thorough and complete, and will fully convey the scope of the concepts to those skilled in the art. Like numbers refer to like, but not necessarily the same or identical elements throughout.

Dispensers used for dispensing compositions may include a locking mechanism or assembly for providing controlled access to the interior of the dispenser. In this way, only authorized individuals may access the interior of the dispenser, for example, to replenish a supply of the composition when depleted, or for maintenance of the dispenser.

Conventionally, a dispenser may be locked by a conventional lock and key, or via a push button. However, such dispensers will not have an ability to swap between a push button or a conventional lock and key, should an installer or a user desire to do so based on their needs. Additionally, dispensers that provide similar functionality often require interchangeable parts or a complex lock cylinder. The complexity of such solutions deters from providing dual-use locking mechanisms.

In embodiments, the present disclosure describes a locking assembly for a dispenser. The locking assembly includes a locking component configured to move between (i) a first position configured to lock a cover of the dispenser, and (ii) a second position configured to unlock the cover. Thus, in the first position, the cover remains secured to the dispenser, and cannot be opened to reveal the interior of the dispenser. When access to the interior is needed, the locking component is moved to the second position. To provide controlled access, the locking assembly further includes a barrel. The barrel is configured to rotate between (i) a first barrel position configured to resist movement of the locking component, and (ii) a second barrel position configured to permit movement of the locking component.

The barrel defines a barrel opening configured to receive a key. The key may be used to rotate the barrel between the first and second barrel positions. In the second barrel position, the key may further be used to push the barrel (and the locking component) to cause the locking component to move to the second position. Alternatively, after rotating the barrel to the second barrel position, the key may be removed, and a push button may be secured to the barrel opening. In this alternative configuration, the push button may be pushed to release and open the cover. If locking of the interior is desired, the push button may be removed, and the key may be used to again lock the assembly. In some embodiments, either a keyed or push button operation may be selected at the time of installation. The push button may be optionally installed for a generally permanent push button operation.

Thus, the locking assembly according to the present disclosure provides a dual-purpose push button and lock and key dispenser locking mechanism that utilizes a relatively simple mechanical solution to provide a dual functionality. The relatively simple design allows for easy and intuitive operation and on-the-fly switching between both engagement methods. Additionally, the manufacturing of this design may be simplified due to a reduction in the number of operating parts.

The interchangeability between a push button and a keyed lock is provided without requiring interchangeable parts or a complex mechanical solution. Interchangeability of configurations (keyed or push-button) by a simple rotation of the lock itself. The lock is prevented from disengaging the front cover in the keyed method by blockage geometry designed into a back plate to block the downward movement of the lock by being in-line with tabs on the lock.

Figure 1B:
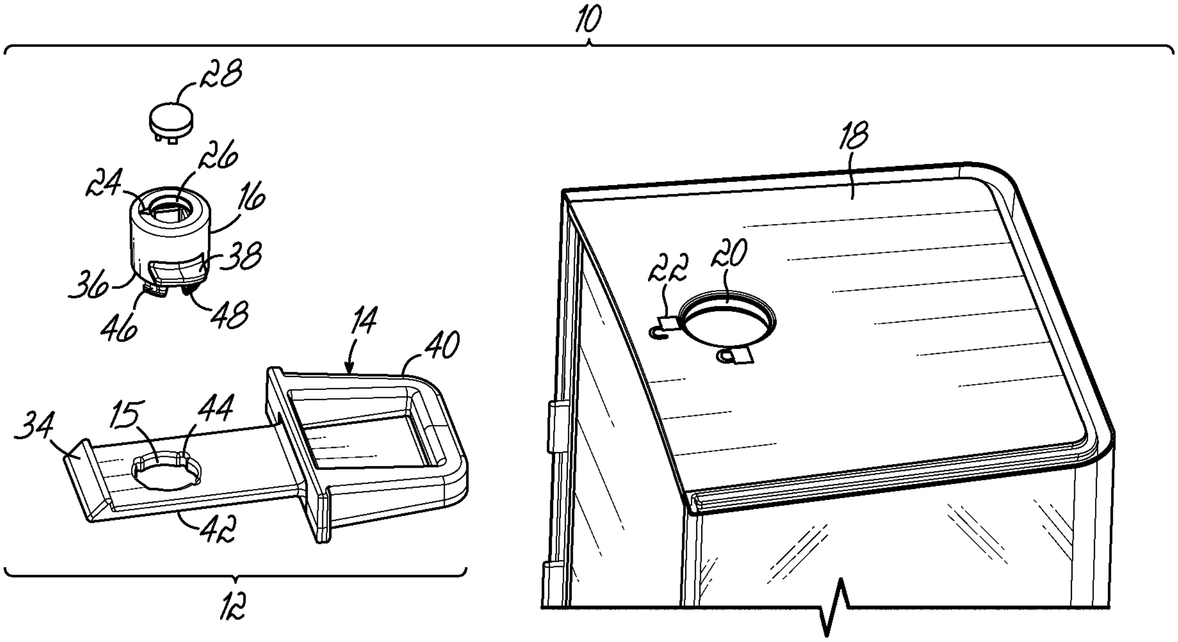
FIG. 1B is a partial exploded view of the dispenser of FIG. 1A.

FIG. 1A is a partial perspective view of a dispenser 10 including a locking assembly 12 including a locking component 14 and a barrel 16. FIG. 1B is a partial exploded view of the dispenser 10 of FIG. 1A.

The dispenser 10 may further include a dispenser plate (shown in FIGS. 2A to 2C) and a cover 18. The dispenser 10 defines an interior closable with the cover 18. The cover 18 is movably coupled to the dispenser plate. The locking assembly 12 releasably secures the cover 18 to the dispenser plate. In embodiments, the cover 18 may be in the form of a lid or a plate, and the dispenser may include a formed housing instead of the dispenser plate. Regardless of the form of the cover 18 and the remaining portion of the dispenser (whether a housing or a plate), the locking assembly 12 substantially functions in a similar manner.

One or more components of the dispenser 10 may be formed of, include, consist essentially of, or consist of, a plastic material. In some embodiments, substantially all parts of the dispenser 10 may be formed of, include, consist essentially of, or consist of, one or more plastic materials. In some embodiments, substantially all parts of the dispenser 10 may be formed of, include, consist essentially of, or consist of, the same plastic material. In embodiments, the plastic material may include polyethylene, polypropylene, or ABS (acrylonitrile butadiene styrene). Other embodiments may include different types of plastic material or other materials, such as metals, composite materials, rubber, and so forth.

The cover 18 may define a cover opening 20 configured to rotatably receive the barrel 16 and expose the barrel 16 to an exterior of the dispenser 10. The cover 18 may define at least one cover marking 22 configured to indicate a locking status of the cover 18. The cover marking 22 may include one or more indicia, for example, alphanumeric or graphical symbols, or combinations thereof. In an embodiment, the cover marking includes a first locked symbol and a second unlocked symbol. The barrel 16 may include a barrel mark 24 which indicates a rotational position. Thus, alignment of the barrel mark 24 with the first locked symbol indicates that the cover 18 is locked, while alignment of the barrel mark 24 with the second unlocked symbol indicates that the cover 18 is unlocked. Any other suitable marking scheme may be used.

Figure 2A:
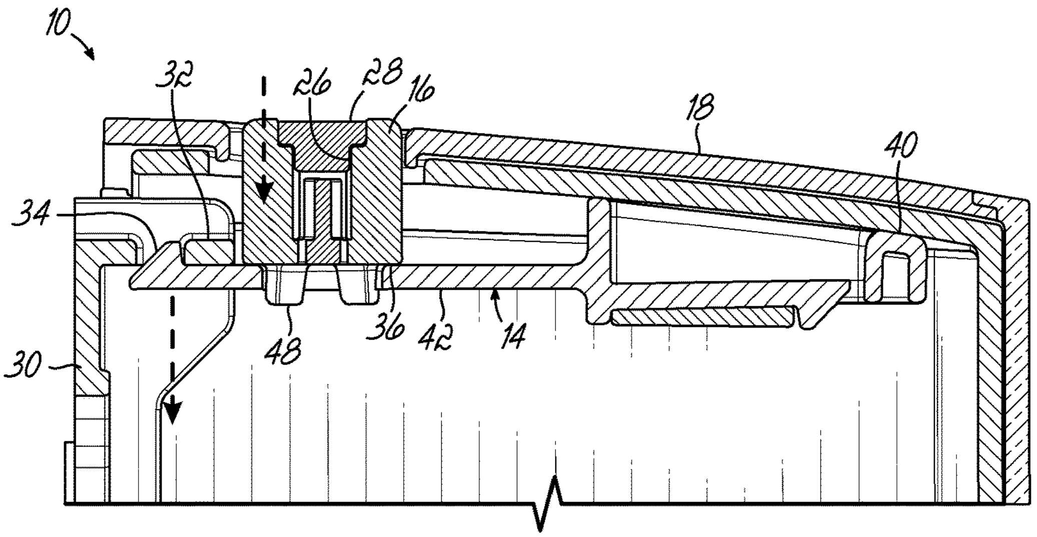
FIG. 2A is a partial cross-sectional view of the dispenser of FIG. 1A with a cover of the dispenser locked by the locking component in a first position.
Figure 2B:
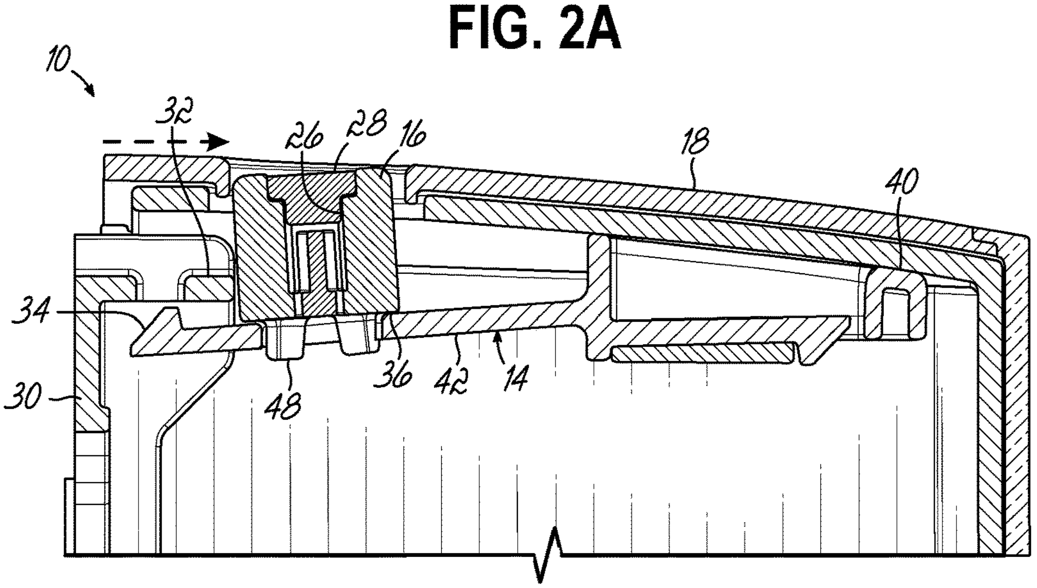
FIG. 2B is a partial cross-sectional view of the dispenser of FIG. 2A with the cover of the dispenser unlocked by the locking component in a second position.
Figure 2C:
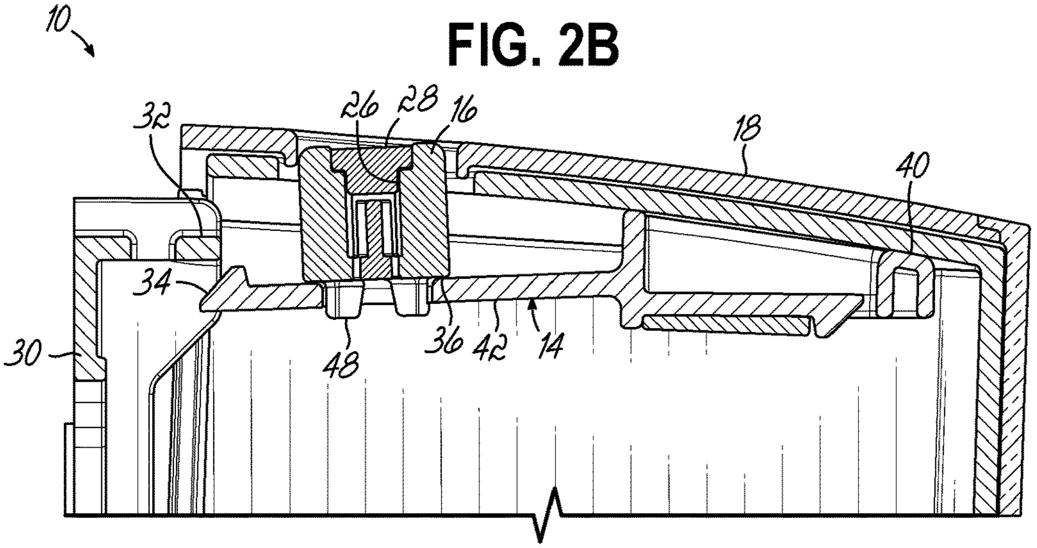
FIG. 2C is a partial cross-sectional view of the dispenser of FIG. 2A with the cover partially opened and released from the locking component.

The locking component 14 is configured to move between (i) a first position configured to lock the cover 18 of the dispenser 10 (shown in FIG. 2A), and (ii) a second position configured to unlock the cover 18 (shown in FIGS. 2B and 2C).

The locking component 14 defines a tab opening 15 configured to rotatably receive the barrel 16. Thus, the barrel 16 may rotate in the tab opening 15 relative to the locking component 14, and the locking component 14 may translate relative to the barrel 16 by relative sliding at the tab opening 15.

The barrel 16 is configured to rotate between (i) a first barrel position configured to resist movement of the locking component 14 (shown in FIGS. 4B, 5A, 7A, 7B, 8A, and 8B) and (ii) a second barrel position configured to permit movement of the locking component 14 (shown in FIGS. 1A, 2A-2C, 3B, 4A, 5B, 8C, and 8D). In the first barrel position, a portion of the dispenser 10 may contact and engage a portion of the barrel 16 (for example, a wing, or a tab of the barrel 16) to resist a translational motion of the barrel 16. In the second barrel position, the portion of the barrel 16 rotates away from the portion of the dispenser 10, and the barrel 16 is now free to translate, for example, vertically. Such a translation of the barrel 16, in turn, causes translation of the locking component 14.

The barrel 16 defines a barrel opening 26 configured to receive a key (shown in FIGS. 8A-8D) or a push button 28 in other embodiments.

For example, in FIGS. 1A and 1B, the push button 28, if included, may be seated within the barrel opening 26, and pushing the push button 28 causes the entire barrel 16 to move into engagement with the locking component 14. A force applied on the push button 28 downward or toward an interior of the dispenser 10 is transmitted to the barrel 16 by the contact between the push button 28 and the opening 26 of the barrel 16. The force transmitted to the barrel 16, in turn, further causes the barrel 16 to push the vertical tab 14 toward the interior of the dispenser. In some embodiments of the locking assembly, the push button 28 may be omitted.

Thus, the locking assembly 10 may include the push button 28 received in the barrel opening 24. The push button 28 may optionally cause the barrel 16 to move between the first and second barrel positions, for example, because the push button 28 may be induce rotation of the barrel 16. In other embodiments, the push button 28 may not induce rotation of the barrel 16, and the barrel 16 therefore cannot be moved between the first and second barrel positions via the push button 28. The push button 28 may present a smooth surface that can be pushed by a force, but in some embodiments cannot be rotated by external contact. Instead, the push button 28 may only cause vertical movement or translation of the barrel 16. This pushing further causing the locking component to move to the second position to unlock the cover 18, as described with reference to FIGS. 2A-2C. In this way, the push button 28 may be used to open the cover 18, but without changing the position of barrel 16 between the first barrel position and the second barrel position.

FIG. 2A is a partial cross-sectional view of the dispenser 10 of FIG. 1A with the cover 18 of the dispenser 10 locked by the locking component 14 in a first position 14*a*. The locking component 14 engages with a dispenser plate 30 of the dispenser 10. The dispenser plate 30 includes a locking bar 32, and the locking component may engage the locking bar 32 to resist movement of the cover 18 away from the dispenser plate 30, as shown in FIG. 2A. In this way, the cover 18 remains secured to the dispenser plate 30. The locking component 14 may define a wedged end 34 configured to engage against and hold the plate 30 of the dispenser 10 to lock the cover 18 of the dispenser 10.

The dispenser plate 30 in turn, may be secured to a wall or some other surface. Thus, releasing the cover 18 from the dispenser plate 30 may reveal the interior of the dispenser 10.

FIG. 2B is a partial cross-sectional view of the dispenser 10 of FIG. 2A in a first intermediate position 10*a* with the cover 18 of the dispenser 10 unlocked by the locking component 14 in a second position 14*a*. Pressing the push button 28 or the barrel 16 directly causes the barrel 16 to push the locking component 14 to flex into the second position 14*a*, released from the locking bar 32. The cover 18 is now ready to be separated from the dispenser plate 30.

The barrel 16 may define a first surface 36 opposing the barrel opening 24, where the first surface 36 is configured to engage and push the locking component 14 from the first position to the second position 14*a*.

FIG. 2C is a partial cross-sectional view of the dispenser of FIG. 2A in a second intermediate position 10*b* with the cover 18 partially opened and released from the locking component 14. Now, the cover 18 is free to be completely opened.

Figure 3A:
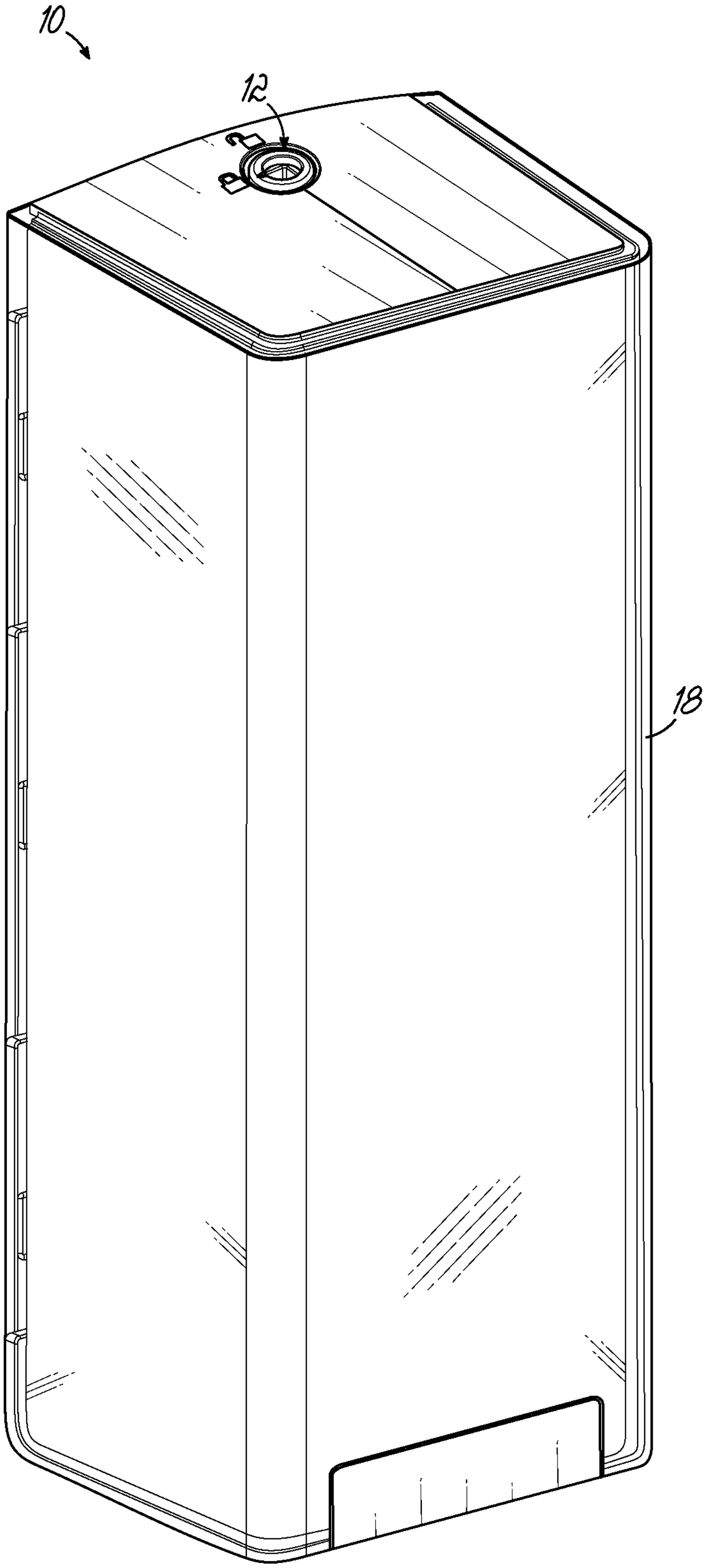
FIG. 3A is a perspective view of the dispenser of FIG. 1A with the cover of the dispenser closed.

FIG. 3A is a perspective view of the dispenser 10 of FIG. 1A with the cover 18 of the dispenser closed.

Figure 3B:
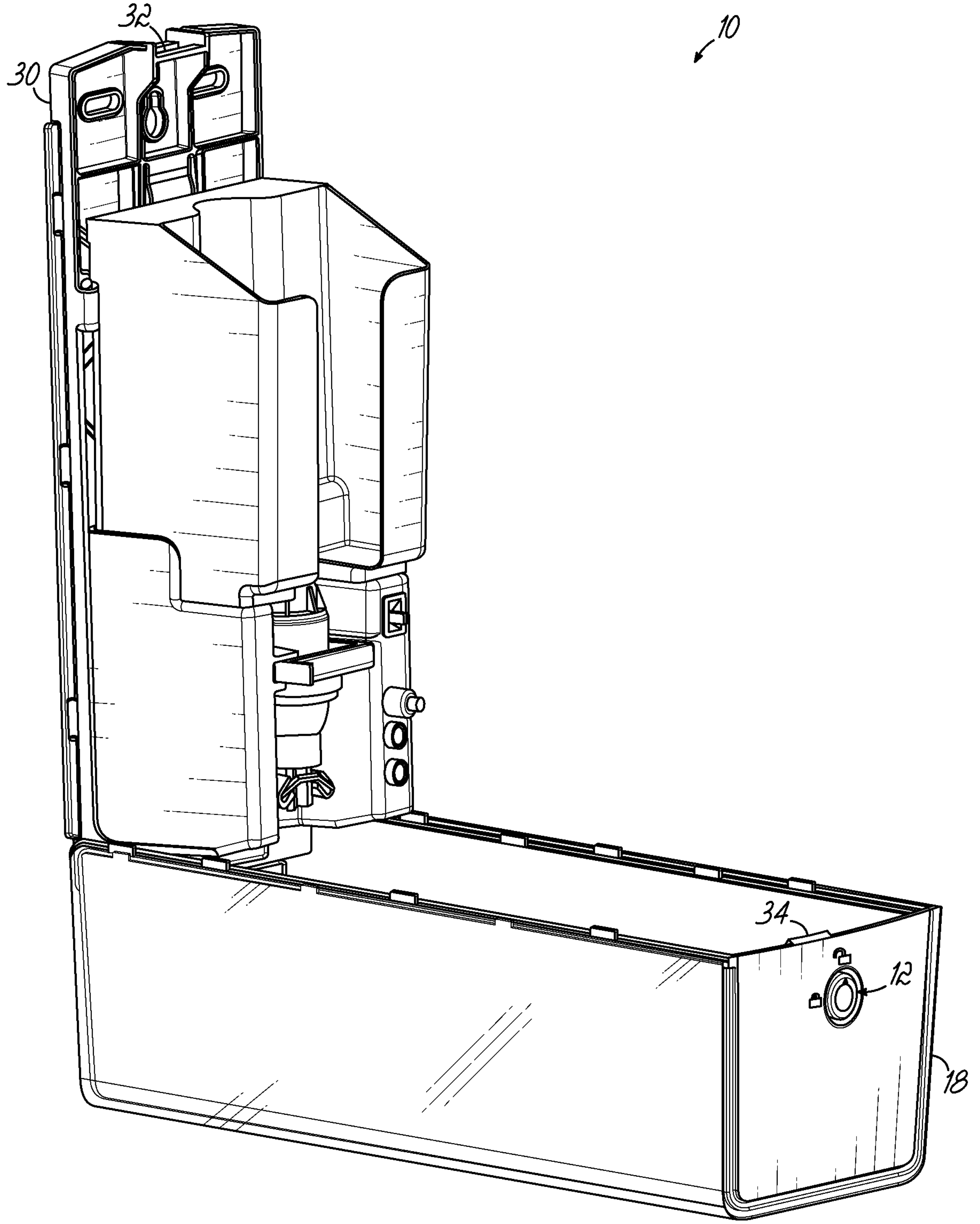
FIG. 3B is a perspective view of the dispenser of FIG. 3A with the cover fully opened to reveal an interior of the dispenser.

FIG. 3B is a perspective view of the dispenser 10 of FIG. 3A in an open position 10*c* with the cover 18 fully opened to reveal an interior of the dispenser 10.

Figure 4A:
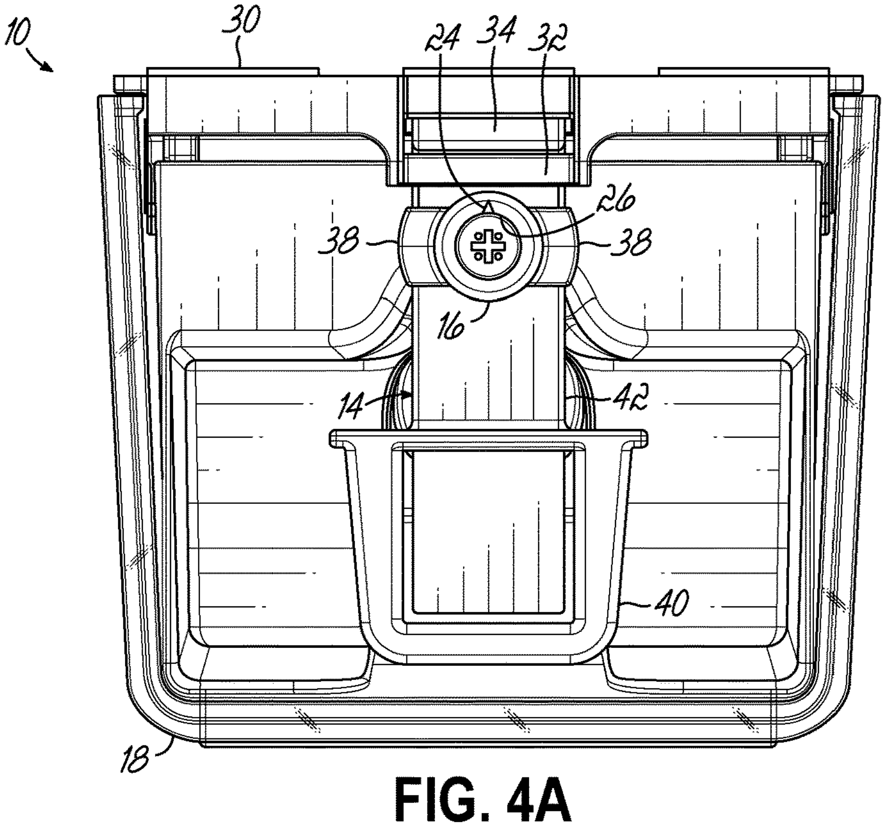
FIG. 4A is a partial upper view of the dispenser of FIG. 1A with the wing of the barrel spaced from the locking bar of the dispenser.
Figure 4B:
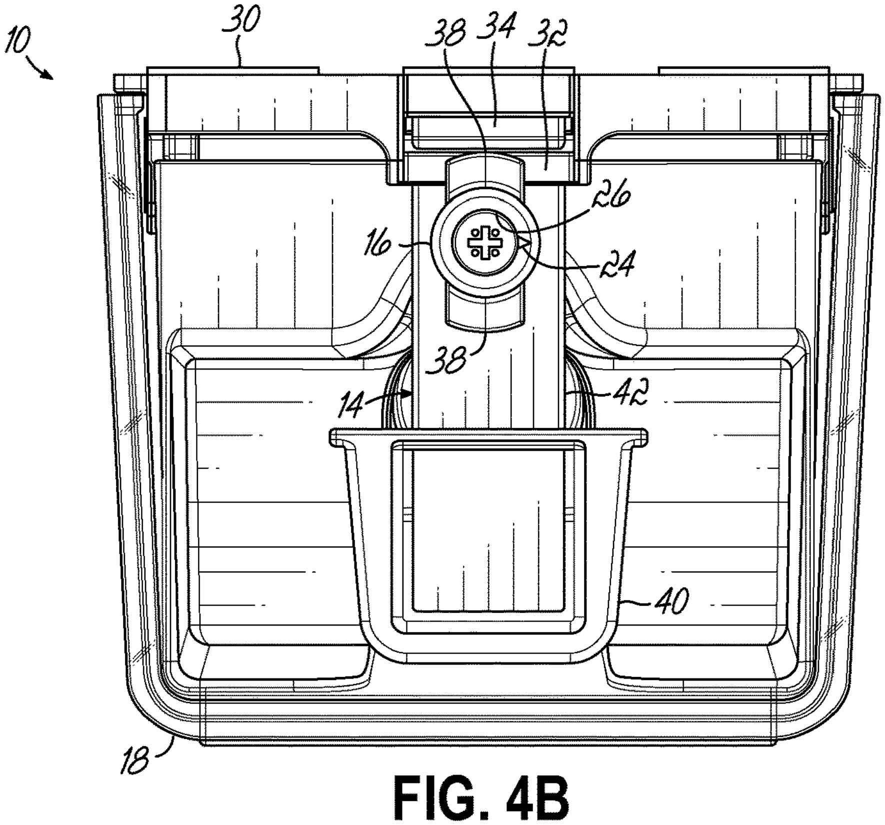
FIG. 4B is a partial upper view of the dispenser of FIG. 4A with a wing of the barrel engaged with a locking bar of the dispenser.

FIG. 4A is a partial upper view of the dispenser 10 of FIG. 1A with a wing 38 of the barrel 16 spaced from the locking bar 32 of the dispenser 10. FIG. 4B is a partial upper view of the dispenser 18 of FIG. 4A with the wing 38 of the barrel 16 (in the first barrel position 16*a*) engaged with the locking bar 32 of the dispenser 10. The barrel 16 may include one or more barrel wings 38 extending laterally from the barrel 16. The barrel wing 38 is configured to (i) engage the locking bar 32 of the dispenser 10 in the first barrel position 16*a*, and (ii) be spaced from the locking bar 32 of the dispenser 10 in the second barrel position (16).

In embodiments, the barrel wing 38 is a first barrel wing, and the barrel 16 may include a second barrel wing opposing the first barrel wing.

Figure 5A:
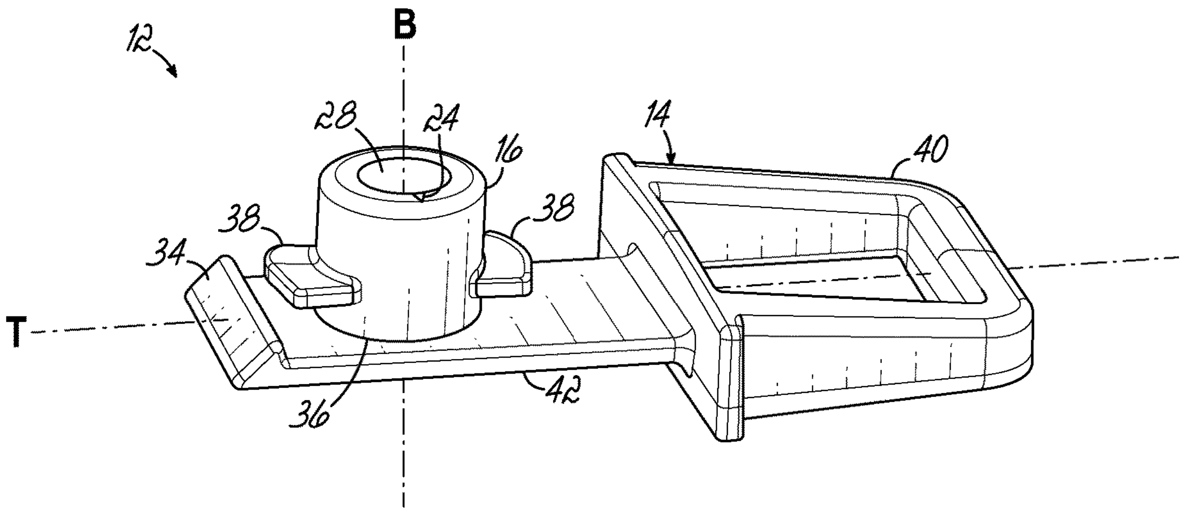
FIG. 5A is a perspective view of the locking assembly of FIG. 1A with the barrel in a first barrel position configured to resist movement of the locking component.

FIG. 5A is a perspective view of the locking assembly of FIG. 1A with the barrel in a first barrel position 16*a* configured to resist movement of the locking component 14. The locking component 14 extends along a tab axis T, and the barrel 16 extends along a barrel axis B transverse to the tab axis T.

The locking component 14 may include a tab seat 40 configured to be securely held within the dispenser 10. The locking component 14 may include a tab bar 42 extending from the tab seat 40 and configured to vertically flex relative to the tab seat 40. In some embodiments, the tab bar 42 defines the tab opening 15.

Figure 5B:
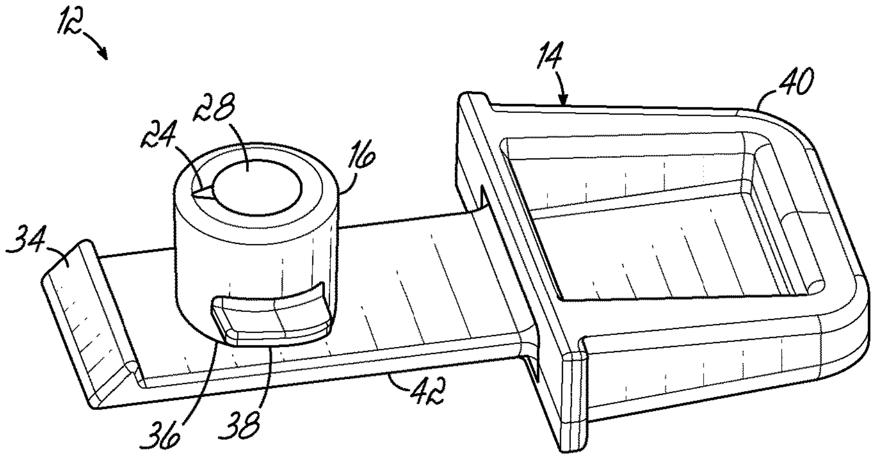
FIG. 5B is a perspective view of the locking assembly of FIG. 5A with the barrel in a second barrel position configured to permit movement of the locking component.

FIG. 5B is a perspective view of the locking assembly of FIG. 5A with the barrel in a second barrel position 16 configured to permit movement of the locking component. FIG. 5B represents the relative orientation of the locking component 14 and the barrel 16 in the unlocked barrel position as shown in FIGS. 1A-2C.

Figure 6A:
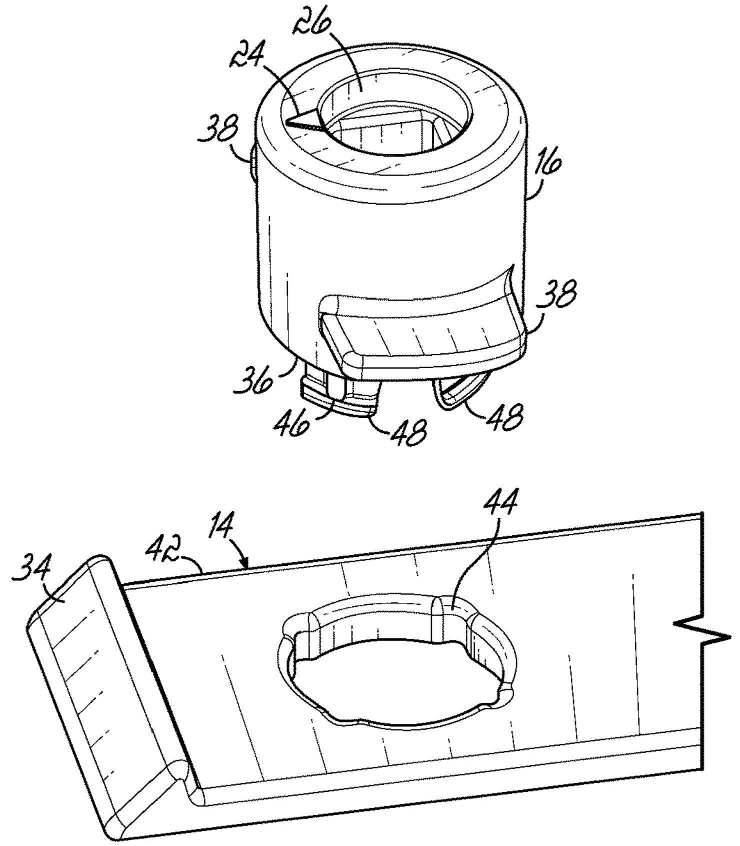
FIG. 6A is a perspective view of the locking assembly of FIG. 1A showing notches of an opening of the locking component configured to receive the barrel.

FIG. 6A is a perspective view of the locking assembly of FIG. 1A showing notches 44 of a tab opening 15 of the locking component 14 configured to receive the barrel 16. The tab opening 15 may define a plurality of notches. For example, the tab opening 15 may include 2, 3, 4, or more notches 44. In embodiments, the tab opening 15 defines 4 symmetrically spaced notches 44.

Figure 6B:
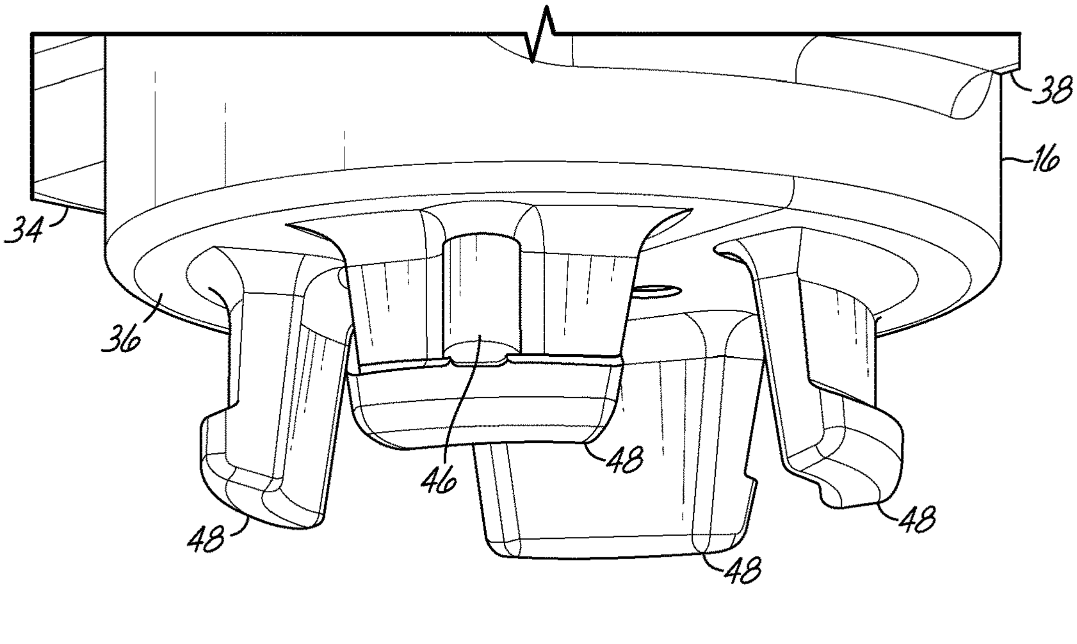
FIG. 6B is a partial perspective view of the barrel of FIG. 6A showing an indent configured to be received in a notch of the locking component opening.

FIG. 6B is a partial perspective view of the barrel of FIG. 6A showing an indent 46 configured to be received in a notch of the locking component opening. The barrel 16 may define at least one indent 46 configured to be received through at least one notch of the plurality of notches 44. Thus, the indent 46 may cooperate with the notches 44 to maintain the barrel 16 in one of two or more predetermined rotational positions (and avoid intermediate rotations). In embodiments, the barrel 16 defines a plurality of legs 48 configured to be received through the tab opening 15, with at least one leg of the plurality of legs 48 defining the at least one indent 46. The at least one indent 46 extends in a direction parallel to the barrel axis B.

Figure 7A:
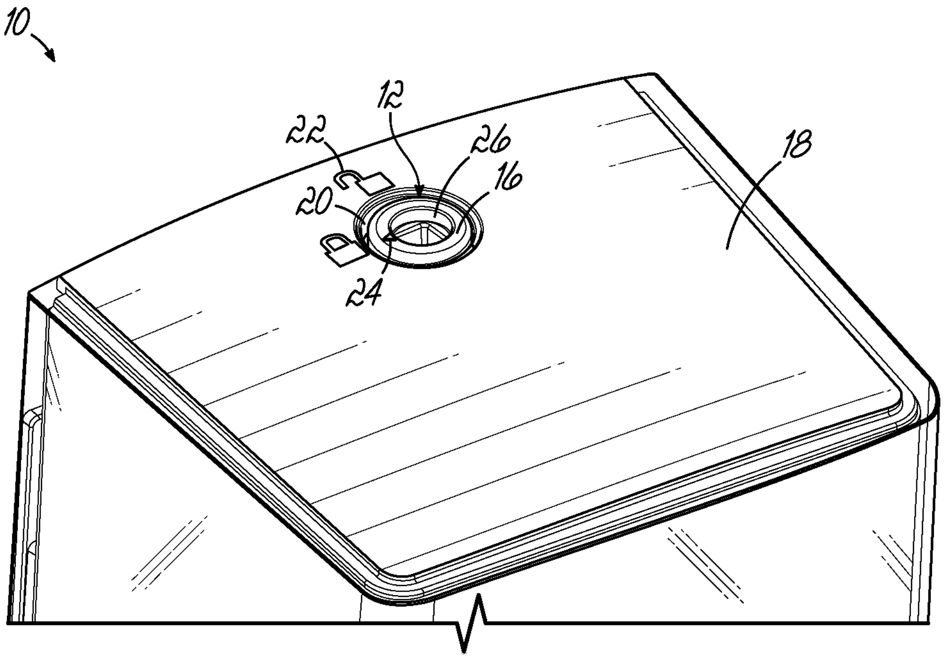
FIG. 7A is a perspective view of the dispenser of FIG. 1A with the barrel opening of the barrel ready to receive a key or a push button in some embodiments.
Figure 7B:
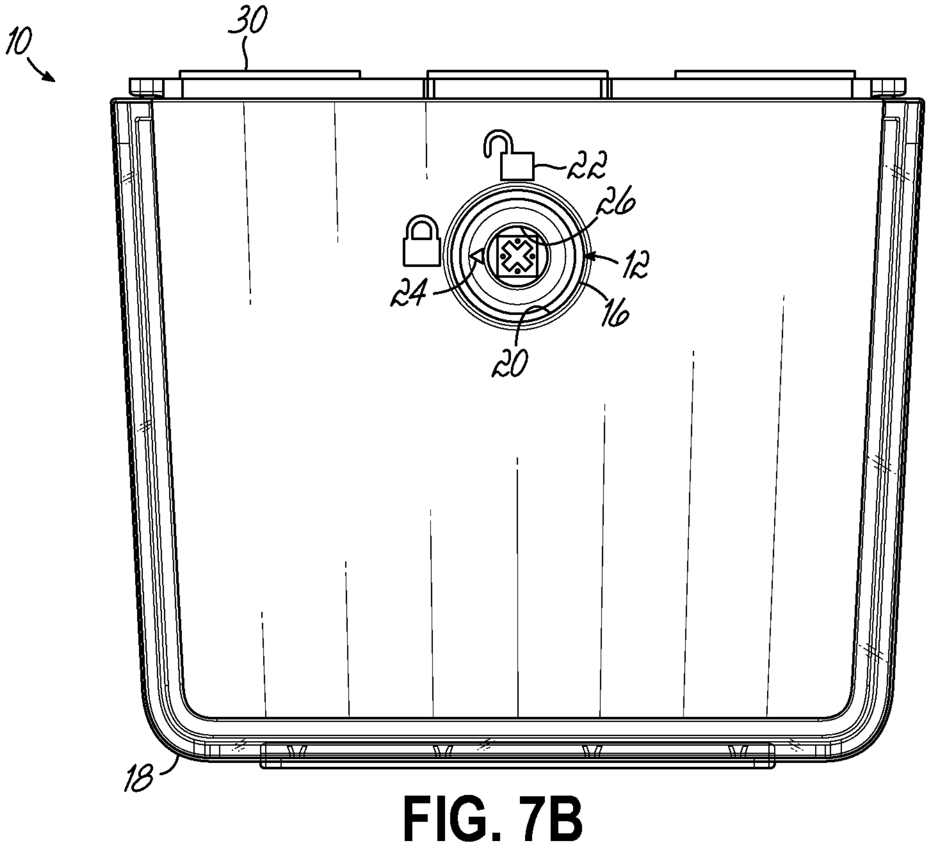
FIG. 7B is a top view of the dispenser of FIG. 7A.

FIG. 7A is a perspective view of the dispenser 10 of FIG. 1A in a configuration 10*d* with the barrel opening 24 of the barrel 16 ready to receive a key or a push button 28. FIG. 7B is a top view of the dispenser 10 of FIG. 7A.

Figure 8A:
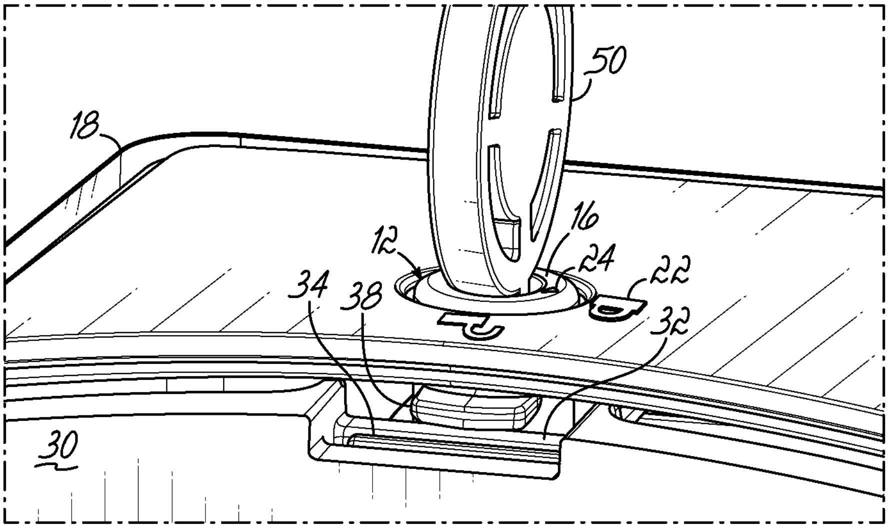
FIG. 8A is a partial perspective view of the locking assembly of FIG. 7A with a key inserted into the barrel opening of the barrel and in a locked position.

FIG. 8A is a partial perspective view of the dispenser of FIG. 7A with a key 50 inserted into the barrel opening 24 of the barrel 16 and in a locked position 10*e*.

Thus, the dispenser 10 may include the key 50 received in the barrel opening 24, and where the key 50 is rotatable to move the barrel 16 between the first and second barrel positions.

Figure 8B:
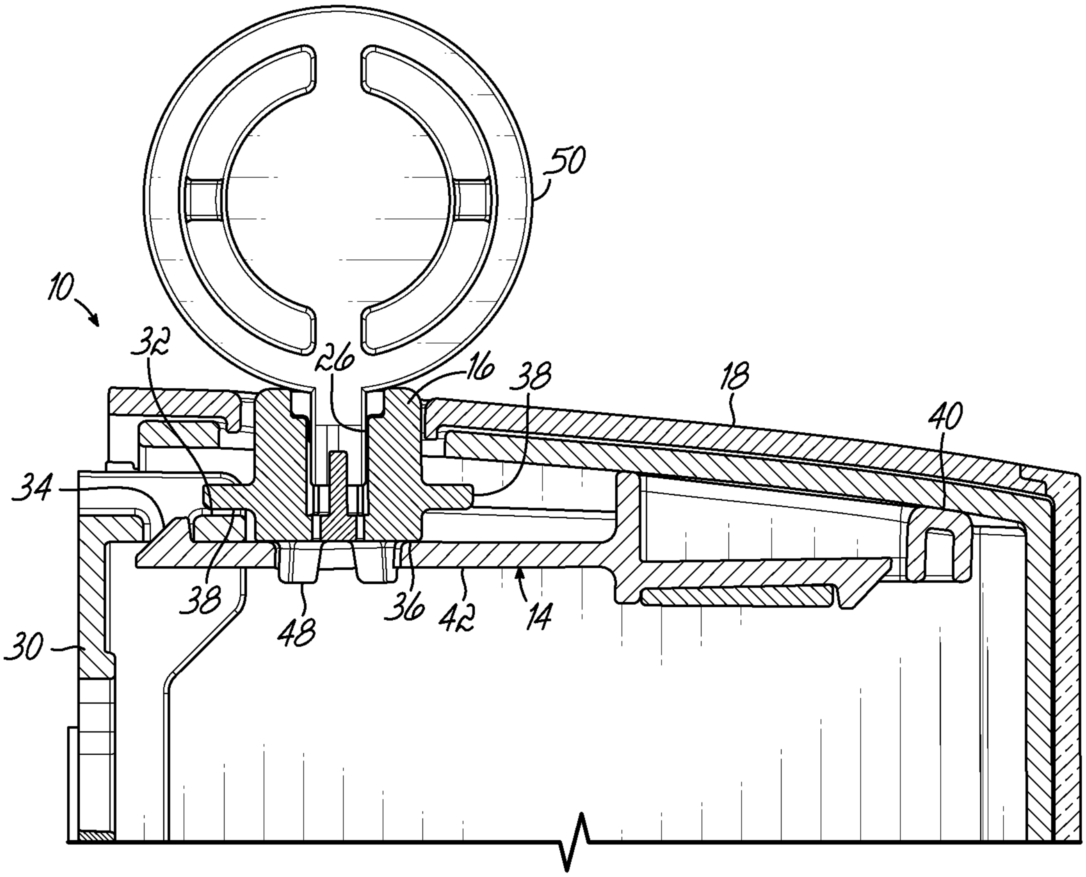
FIG. 8B is a partial cross-sectional view of the locking assembly of FIG. 8A.

FIG. 8B is a partial cross-sectional view of the dispenser 10 of FIG. 8A. The barrel wing 38 is engaged against the locking bar 32, resisting translation of the locking component 14, and keeping the cover 18 locked.

Figure 8C:
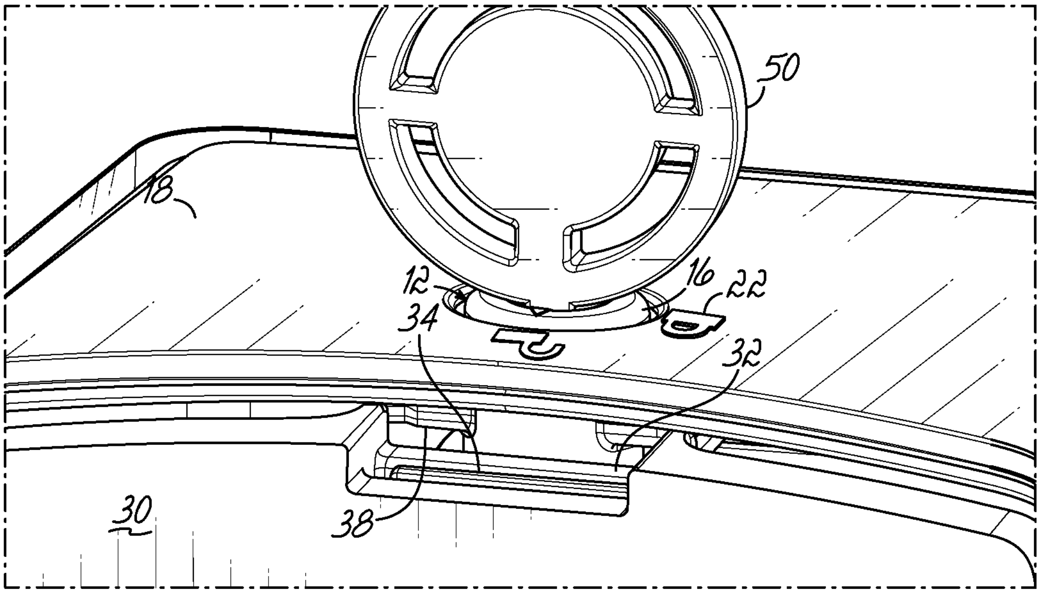
FIG. 8C is a partial perspective view of the locking assembly of FIG. 8A with the key and the barrel rotated to the unlocked position.
Figure 8D:
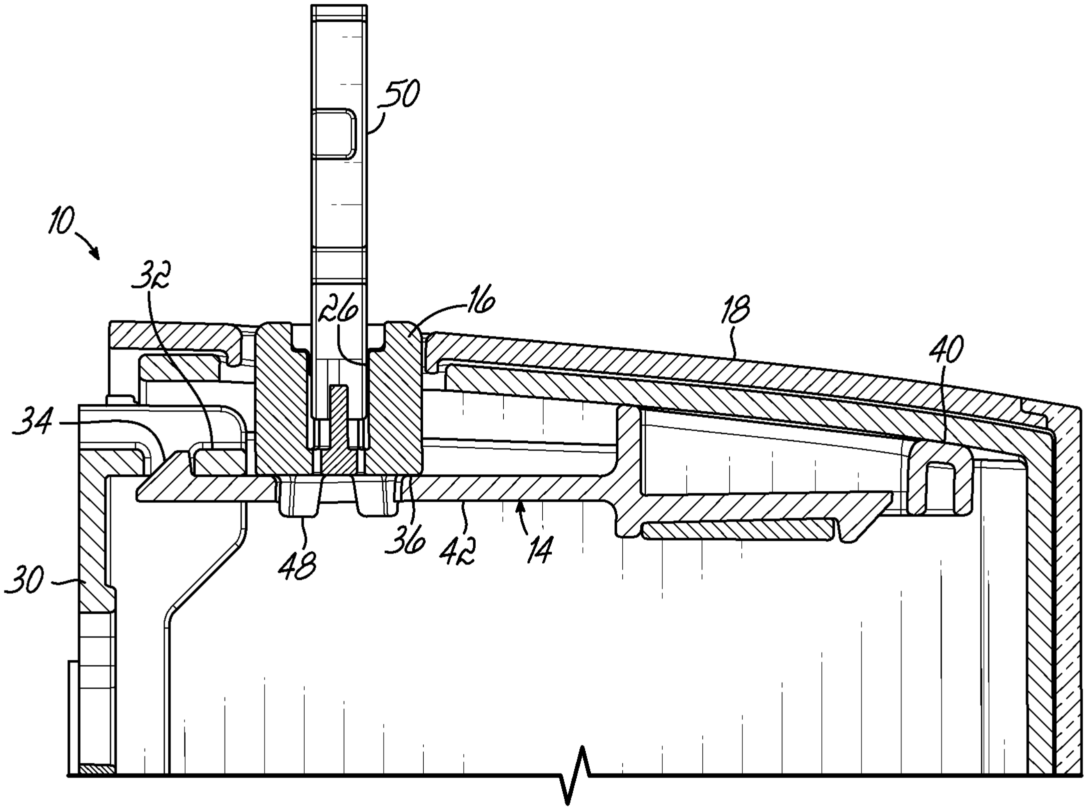
FIG. 8D is a partial cross-sectional view of the locking assembly of FIG. 8C.

FIG. 8C is a partial perspective view of the dispenser 10 of FIG. 8A with the key 50 and the barrel 16 rotated to the unlocked position 10*f*. FIG. 8D is a partial cross-sectional view of the dispenser 10 of FIG. 8C. The barrel win 38 is rotated away from the locking bar 32, and now the locking component 14 is free to translate, allowing the cover 18 to be unlocked by translation of the locking component 14.

Figure 9A:
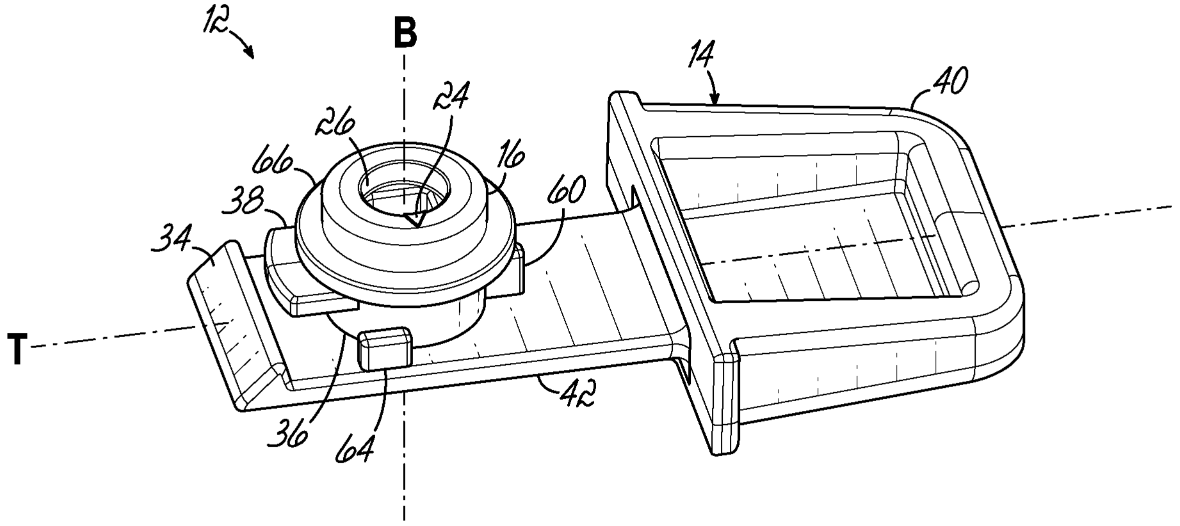
FIG. 9A is a perspective view of another embodiment of the locking assembly according to this invention with the barrel in a first barrel position configured to resist movement of the locking component.

Another embodiment of this invention is shown in FIGS. 9A-11B. FIG. 9A is a perspective view of the locking assembly with the barrel 16 in a first barrel position configured to resist movement of the locking component 14. The locking component 14 extends along a tab axis T, and the barrel 16 extends along a barrel axis B transverse to the tab axis T. The barrel 16 has a tab 60 projecting radially outward and the rotation of the barrel 16 is blocked in a first rotational direction by the tab 60 abutting against a first detent 62 projecting upwardly from the tab bar 42.

Figure 9B:
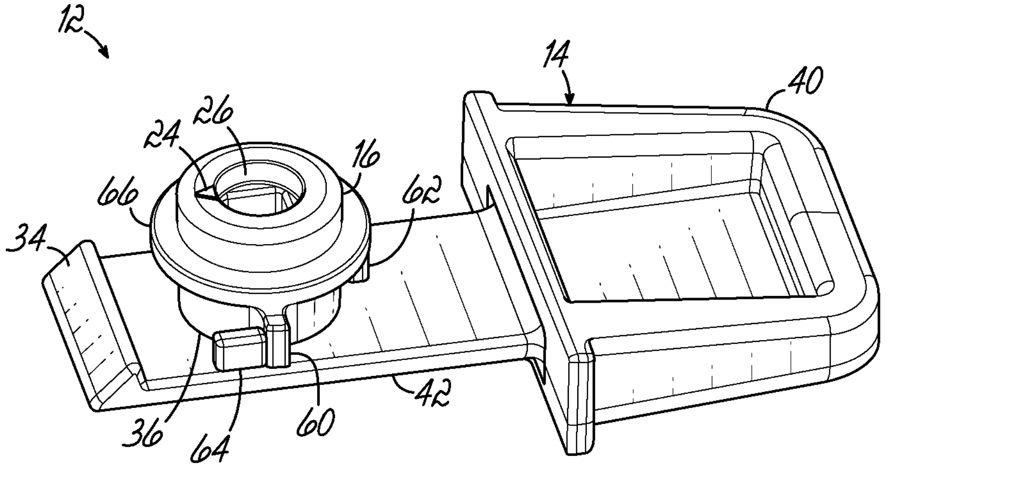
FIG. 9B is a perspective view of the locking assembly of FIG. 9A with the barrel in a second barrel position configured to permit movement of the locking component.

The tab bar 42 extends from the tab seat 40 and is configured to vertically flex relative to the tab seat 40. In some embodiments, the tab bar 42 defines the tab opening 15. FIG. 9B is a perspective view of the locking assembly of FIG. 9A with the barrel 16 in a second barrel position configured to permit movement of the locking component. FIG. 9B represents the relative orientation of the locking component 14 and the barrel 16 in the unlocked barrel position in which the tab 60 and barrel 16 have been rotated about 90 degrees to place the tab 60 in contact with a second detent 64 as shown in FIG. 9B.

Figure 9C:
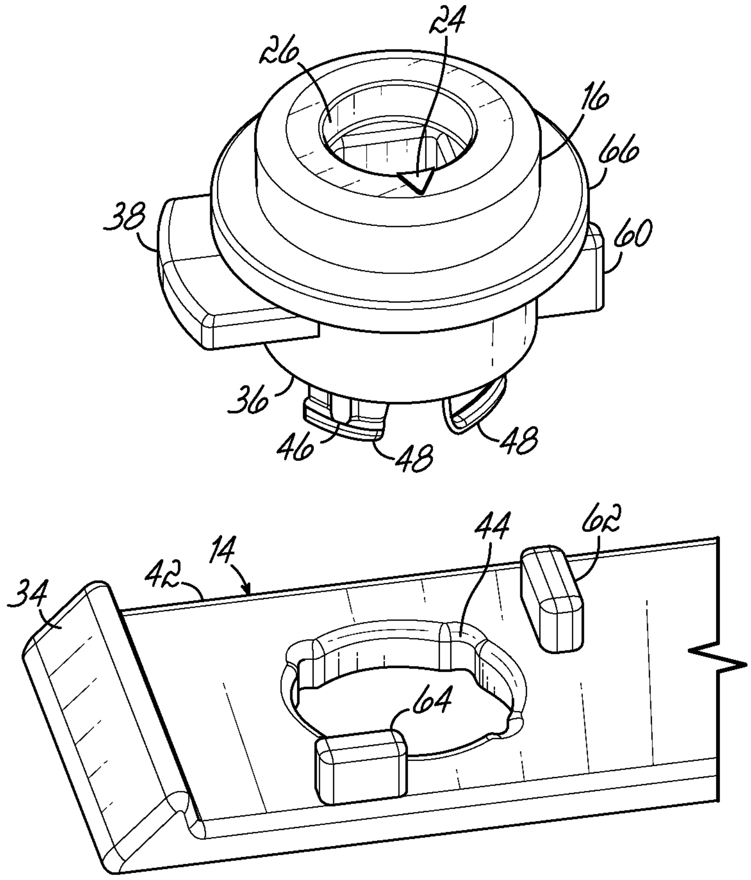
FIG. 9C is a perspective view of the locking assembly of FIG. 9A showing notches of an opening of the locking component configured to receive the barrel.

FIG. 9C is a perspective view of the locking assembly showing notches 44 of a tab opening 15 of the locking component 14 configured to receive the barrel 16. The tab opening 15 may define a plurality of notches. For example, the tab opening 15 may include 2, 3, 4, or more notches 44. In embodiments, the tab opening 15 defines 4 symmetrically spaced notches 44. The barrel 16 may include a circumferential flange 66 positioned atop the tab 60.

The barrel 16 may define at least one indent 46 configured to be received through at least one notch 44 of the plurality of notches 44. Thus, the indent 46 may cooperate with the notches 44 to maintain the barrel 16 in one of two or more predetermined rotational positions (and avoid intermediate rotations). In embodiments, the barrel 16 defines a plurality of legs 48 configured to be received through the tab opening 15, with at least one leg of the plurality of legs 48 defining the at least one indent 46. The at least one indent 46 extends in a direction parallel to the barrel axis B.

Figure 10A:
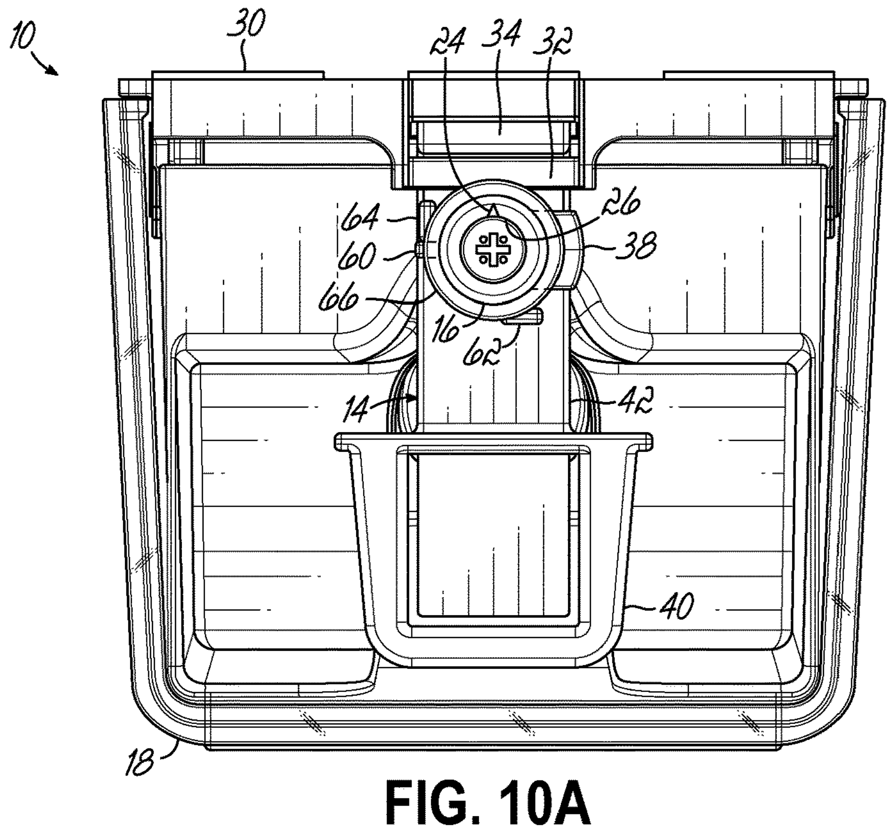
FIG. 10A is a partial upper view of the dispenser of FIG. 1A with the wing of the barrel spaced from the locking bar of the dispenser.
Figure 10B:
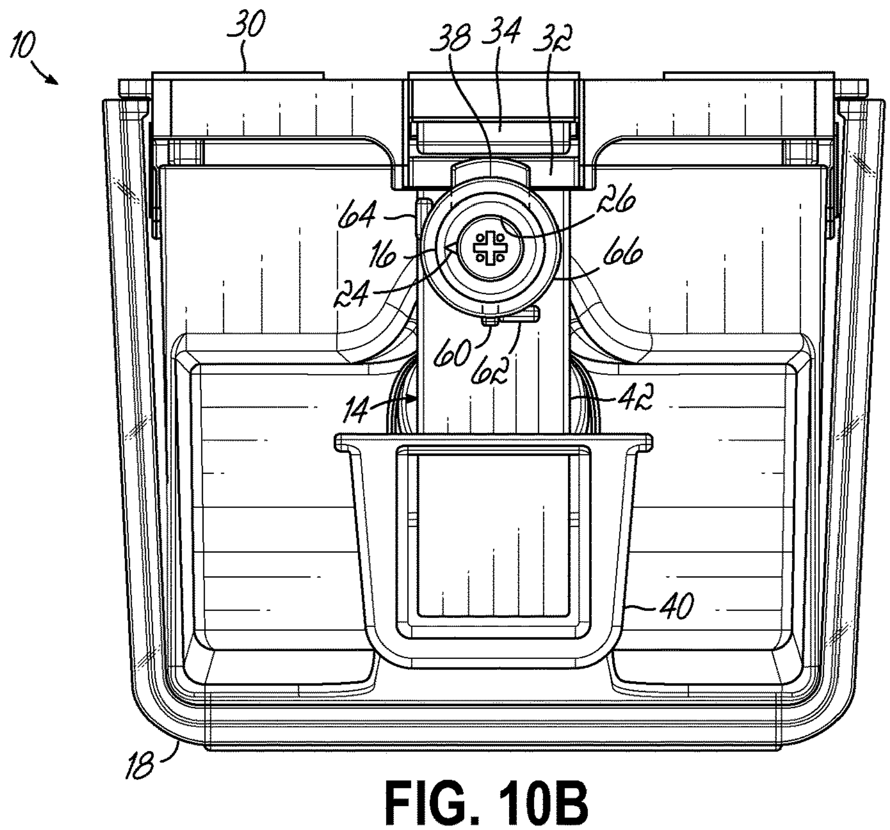
FIG. 10B is a partial upper view of the dispenser of FIG. 10A with a wing of the barrel engaged with a locking bar of the dispenser.
Figure 11A:
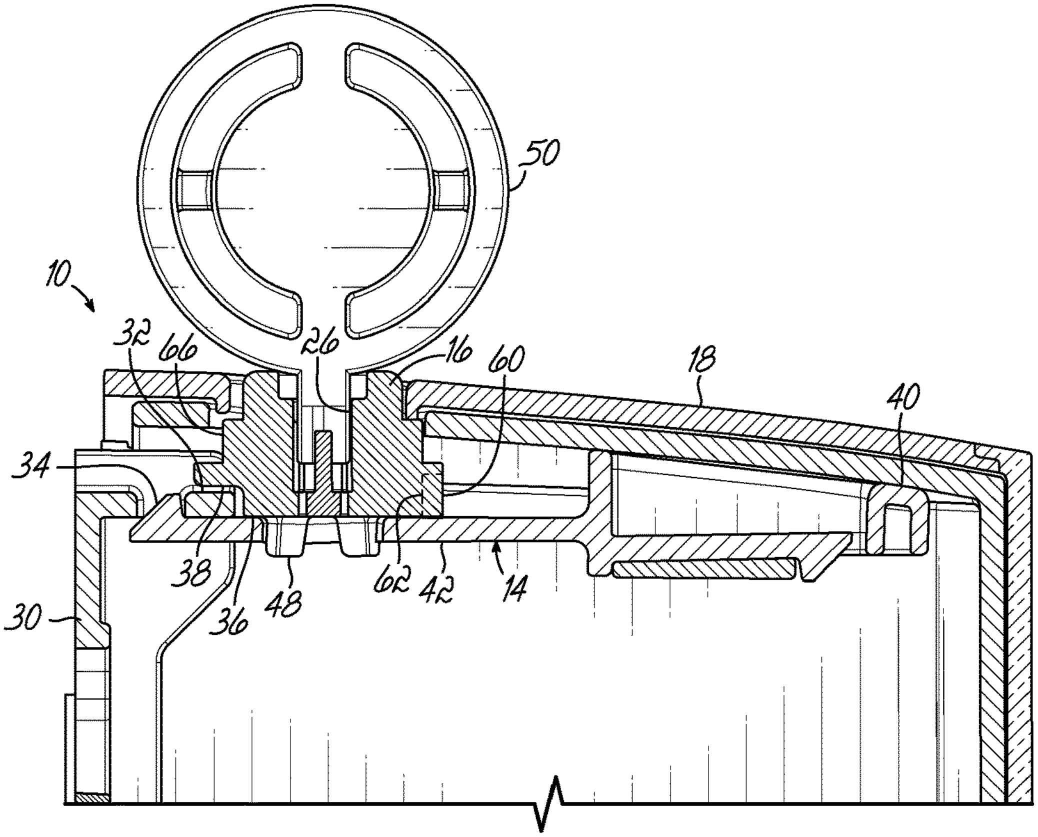
FIG. 11A is a partial cross-sectional view of the locking assembly of FIG. 9A thru 10B.

FIGS. 10A and 10B are top plan views of the dispenser with the locking component 14 in the locked position and the unlocked position, respectively. In the locked position, the barrel 16 cannot be pressed downwardly to release the cover because of the flange 66 abutting the locking bar 32 as shown in FIG. 11A. Rotation of the key 50 likewise rotates the barrel 16 to avoid the interference of the flange 66 and the locking bar 32 to allow the barrel 16 to be pressed downwardly to disengage the wedged end 34 for opening of the dispenser. FIG. 11A is a partial perspective view of the dispenser with a key 50 inserted into the barrel opening 24 of the barrel 16 and in a locked position.

Thus, the dispenser 10 may include the key 50 received in the barrel opening 24, and where the key 50 is rotatable to move the barrel 16 between the first and second barrel positions. The tab 60 is engaged against the second detent 64, resisting translation of the locking component 14, and keeping the cover 18 locked.

Figure 11B:
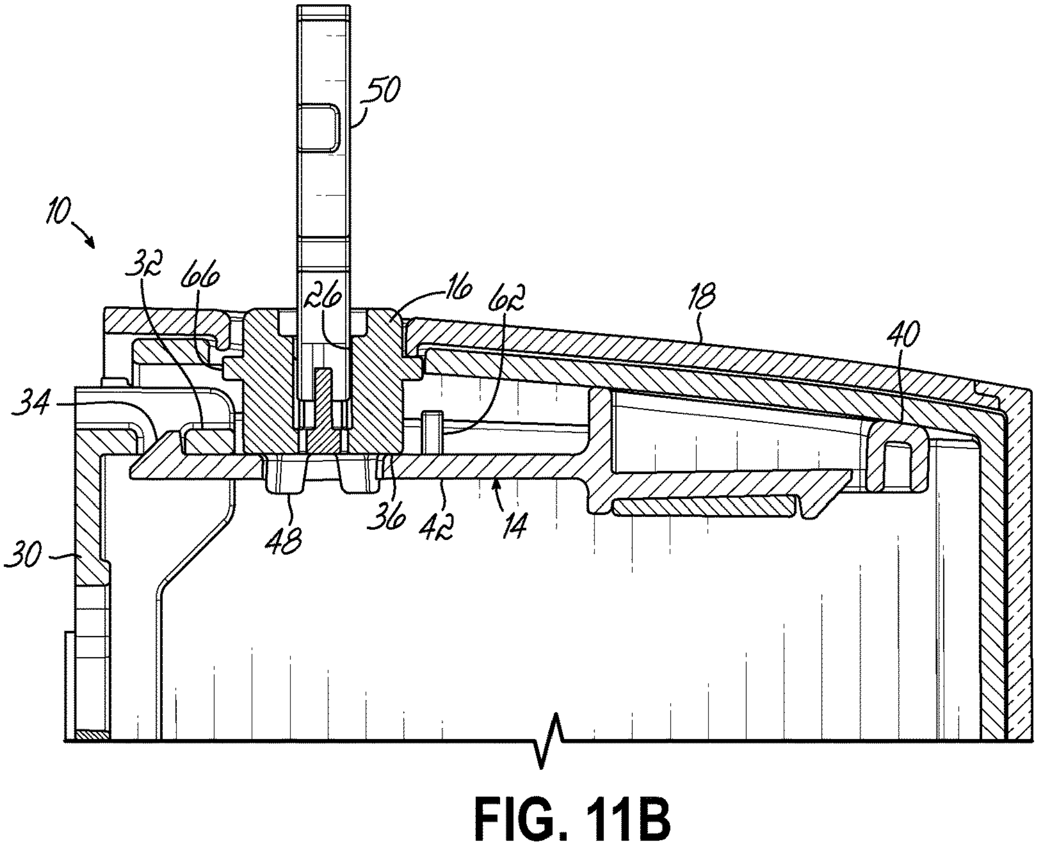
FIG. 11B is a partial perspective view of the locking assembly of FIG. 11A with the key and the barrel rotated to the unlocked position.

FIG. 11B is a partial perspective view of the dispenser 10 of FIG. 11A with the key 50 and the barrel 16 rotated to the unlocked position with the tab 60 engaged against the second detent 64. The barrel 16 is rotated away from the locking position, and now the locking component 14 is free to translate, allowing the cover 18 to be unlocked by translation of the locking component 14.

Though the disclosed examples include particular arrangements of a number of parts, components, features, and aspects, the disclosure is not limited to only those examples or arrangements shown. Any one or more of the parts, components, features, and aspects of the disclosure may be employed alone or in other arrangements of any two or more of the same.

Although certain product features, functions, components, and parts have been described herein in accordance with the teachings of the present disclosure, the scope of coverage of this patent is not limited thereto. On the contrary, this patent covers all embodiments of the teachings of the disclosure that fairly fall within the scope of permissible equivalents.

Unless otherwise noted, the terms used herein are to be understood according to conventional usage by those of ordinary skill in the relevant art. In addition to the definitions of terms provided below, it is to be understood that as used in the specification and in the claims, "a" or "an" may mean one or more, depending upon the context in which it is used.

Throughout this application, the term "include," "include(s)" or "including" means "including but not limited to." Note that certain embodiments may be described relating to a single glass, but the corresponding description should be read to include embodiments of two or more glasses. Different features, variations, and multiple different embodiments are shown and described herein with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by this disclosure. It is indeed intended that the scope of this disclosure should be determined by a proper legal interpretation and construction of the disclosure, including equivalents, as understood by those of skill in the art relying upon the complete disclosure present at the time of filing Conditional language, such as, among others, “can,” “could,” “might,” or “may,” unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and drawings includes examples of systems, apparatuses, methods, devices, and/or techniques. It is, of course, not possible to describe every conceivable combination of components and/or methods for purposes of describing the various elements of the disclosure, but it may be recognized that many further combinations and permutations of the disclosed elements are possible. Accordingly, it may be apparent that various modifications may be made to the disclosure without departing from the scope thereof In addition, or as an alternative, other embodiments of the disclosure may be apparent from consideration of the specification and annexed drawings, and practice of the disclosure as presented herein. It is intended that the examples put forth in the specification and annexed drawings be considered, in all respects, as illustrative and not limiting. Although specific terms are employed herein, they are used in a generic and descriptive sense only and not for purposes of limitation.

What is claimed is:

1. A locking assembly for a dispenser, the locking assembly comprising:

a locking component configured to move between (i) a first position configured to lock a cover of the dispenser, and (ii) a second position configured to unlock the cover; and a barrel defining a barrel opening, the barrel being configured to rotate between (i) a first barrel position configured to resist movement of the locking component, and (ii) a second barrel position configured to permit movement of the locking component;

a key; and a push button; wherein the key and the push button are alternatively receivable in the barrel opening;

upon receipt of the key within the barrel opening, the key is rotatable to move the barrel between the first and second barrel positions; and upon receipt of the push button within the barrel opening, the barrel cannot be moved between the first and second barrel positions via the push button.

2. The locking assembly of claim 1, wherein the barrel defines a first surface opposing the barrel opening, wherein the first surface is configured to engage and push the locking component from the first position to the second position.

3. The locking assembly of claim 1, wherein the locking component extends along a tab axis, and wherein the barrel extends along a barrel axis transverse to the tab axis.

4. The locking assembly of claim 1, wherein the locking component defines a wedged end configured to engage against and hold the cover of the dispenser to lock the cover of the dispenser.

5. The locking assembly of claim 1, wherein the locking component defines a tab opening configured to rotatably receive the barrel.

6. The locking assembly of claim 5, wherein the tab opening defines a plurality of notches, and wherein the barrel defines at least one indent configured to be received through at least one notch of the plurality of notches.

7. The locking assembly of claim 6, wherein the barrel defines a plurality of legs configured to be received through the tab opening, at least one leg of the plurality of legs defining the at least one indent.

8. The locking assembly of claim 6, wherein the at least one indent extends in a direction parallel to the barrel axis.

9. The locking assembly of claim 5, wherein the locking component comprises a tab seat configured to be securely held within the dispenser.

10. The locking assembly of claim 9, wherein the locking component comprises a tab bar extending from the tab seat and configured to vertically flex relative to the tab seat.

11. The locking assembly of claim 10, wherein the tab bar defines the tab opening.

12. The locking assembly of claim 1, wherein the barrel comprises a barrel wing extending laterally from the barrel, wherein the barrel wing is configured to (i) engage a locking bar of the dispenser in the first barrel position, and (ii) be spaced from the locking bar of the dispenser in the second barrel position.

13. The locking assembly of claim 12, wherein the barrel wing is a first barrel wing, and wherein the barrel comprises a second barrel wing opposing the first barrel wing.

14. The locking assembly of claim 1, wherein the barrel comprises a barrel mark configured to indicate the position of the barrel.

15. The locking assembly of claim 1, wherein at least one of the barrel and the locking assembly is formed of a plastic.

16. A dispenser comprising:

a dispenser plate;

a cover movably coupled to the dispenser plate; and the locking assembly of claim 1 releasably securing the cover to the dispenser plate.

17. The dispenser of claim 16, wherein the cover defines a cover opening configured to rotatably receive the barrel and expose the barrel to an exterior of the dispenser.

18. The dispenser of claim 17, wherein the cover defines at least one cover marking configured to indicate a locking status of the cover.

* * * * *